Nov. 29, 1927.
G. S. BAKER
1,651,242
MACHINE FOR MOLDING PLASTIC CONFECTIONS
Filed Sept. 3, 1921
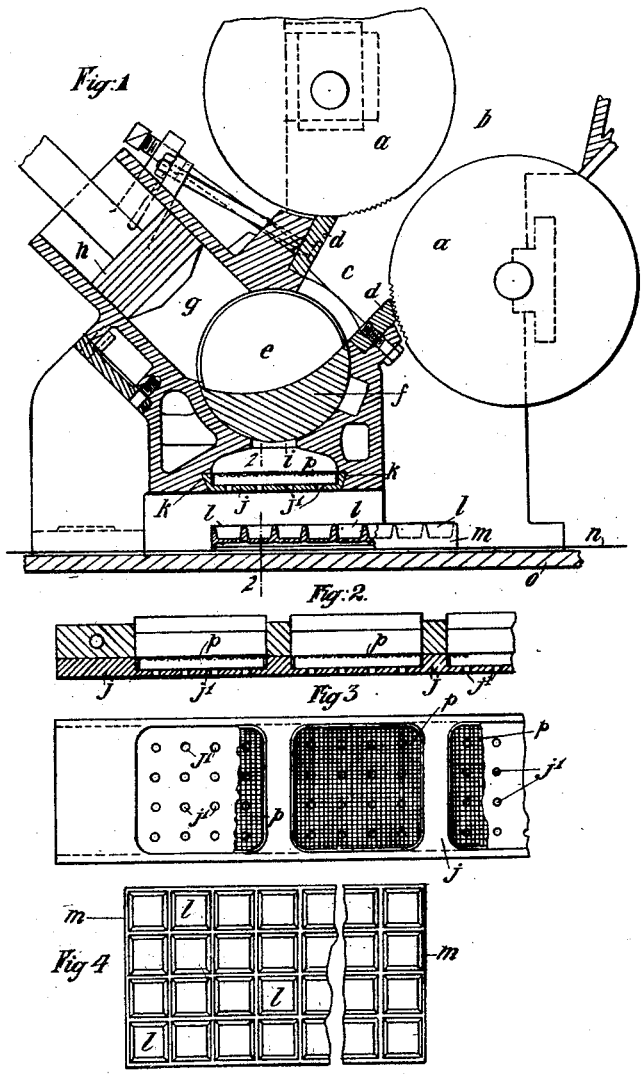
Inventor.
George Samuel Baker.
By his Attorney.

Patented Nov. 29, 1927.

1,651,242

UNITED STATES PATENT OFFICE.

GEORGE SAMUEL BAKER, OF LONDON, ENGLAND, ASSIGNOR TO BAKER-PERKINS COMPANY, INC., OF WHITE PLAINS, NEW YORK, A CORPORATION OF NEW YORK.

MACHINE FOR MOLDING PLASTIC CONFECTIONS.

Application filed September 3, 1921, Serial No. 498,494, and in Great Britain January 26, 1914.

(GRANTED UNDER THE PROVISIONS OF THE ACT OF MARCH 3, 1921, 41 STAT. L., 1313.)

This invention relates to the molding of chocolate and like plastic materials in the manufacture of confectionery, and comprises novel means for use with molds of sectional or divided character whereby an individual or separate deposit of material may be effected in each section or division of the mold each mold being filled with a measured quantity of material.

The invention further consists, in a depositing machine for example, for dealing with chocolate, in the provision of a die provided with a series of individual or separated outlets spaced to correspond to the divisions or sections of the particular mold used. The invention also consists in the details of construction and combinations of parts hereinafter described and pointed out in the claim.

The invention is illustrated in the accompanying drawings in which Figure 1 is a sectional view of part of a chocolate depositing machine of known construction, with the exception of the improved die referred to above. Figure 2 is a partial cross section of Figure 1 on the line 2—2. Figure 3 is a partial plan view of the improved form of die, and Figure 4 is a plan view of a sectional mold of conventional form.

Referring to Fig. 1, the portion of the machine illustrated, which is merely given as an example, comprises the rolls $a$ which force the material from a hopper $b$ through a spout $c$ provided with scrapers $d$ and through a channel $e$ in a rotary valve $f$ into a measuring cylinder $g$ containing a plunger $h$ which, when the valve is rotated, is actuated to force the material from said cylinder through the outlet $i$.

This construction of machine is well known in the art, but according to this invention I provide below said outlet $i$ a die or nozzle $j$ mounted in dovetail guides $k$ in the machine framing so as to be readily removable, this die comprising one or more series of separated apertures $j^1$ spaced apart at such distances that each aperture will cause an individual or separate quantity of material to be deposited centrally into a section or division $l$ of a mold $m$ below said die and which may be caused to travel intermittently through the machine, for example by being placed on a conveyor $n$ movable over the table $o$ of the machine. The die is preferably provided with a removable strainer $p$ for each series of apertures $j^1$ formed of wire gauze or other appropriate material to prevent lumps or foreign matter which may be present in the material from passing to the apertures $j^1$ and to distribute the material equally to equalize the pressure on the material for forcing it through the aperture of the dies.

The form of mold illustrated which is one commonly used in confectionery works comprises thirty-two sections or divisions, whereas the die shown contains but sixteen discharge apertures, so that it is necessary to first bring the front portion of the mold beneath the die for filling the first sixteen sections, and then to move the mold to bring its rear part below said die for filling the remaining sixteen sections, this method being preferable to providing the die with thirty-two discharge apertures, since the amount of feed or "skip" of the conveyor $n$ and consequently of the molds between each period of rest for filling need not be excessive. However, any arrangement of the discharge apertures and molds with corresponding sections may be used according to requirements, obviously for the smaller groups of molds it is advantageous to fill the complete mold at one discharge.

The die may contain any number of series of discharge apertures according to the width of the machine for filling a corresponding number of rows of molds fed along on the conveyor, and it will be apparent that by the method of mounting the die adopted the same may be readily removed and replaced by a die having differently spaced apertures to correspond with any particular form of sectional mold employed.

What I claim as my invention and desire to secure by Letters Patent of the United States is:—

In a machine of the character described having a guide-way therein, the combination with a mold divided into a plurality of compartments, of means for delivering material to the mold, said means including a die removably received in the guide-way, the die being formed of an elongated plate provided with longitudinally spaced depressions, the bottom of each depression having separate discharge apertures spaced apart at such distances as to correspond with the compartments of the mold, and a removable strainer received in each of the depressions and positioned above and over the apertures in the bottom of the depression, the strainers being normally movable with the die.

In witness whereof I have signed this specification.

GEORGE SAMUEL BAKER.